(12) United States Patent
Prokopenko et al.

(10) Patent No.: US 7,696,993 B2
(45) Date of Patent: Apr. 13, 2010

(54) GEOMETRY PRIMITIVE TYPE CONVERSION IN A GPU PIPELINE

(75) Inventors: Boris Prokopenko, Milpitas, CA (US); Hsilin (Stephen) Huang, Milpitas, CA (US); Ping Chen, San Jose, CA (US)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 387 days.

(21) Appl. No.: 11/672,692

(22) Filed: Feb. 8, 2007

(65) Prior Publication Data

US 2008/0192057 A1   Aug. 14, 2008

(51) Int. Cl.
*G06T 17/00* (2006.01)
(52) U.S. Cl. .................. 345/420; 345/423; 345/441
(58) Field of Classification Search .......... 345/420, 345/423, 441
See application file for complete search history.

(56) References Cited

U.S. PATENT DOCUMENTS

| | | | | |
|---|---|---|---|---|
| 5,561,749 | A * | 10/1996 | Schroeder | 345/420 |
| 6,496,185 | B1 * | 12/2002 | Keam | 345/419 |
| 7,324,105 | B1 * | 1/2008 | Moreton et al. | 345/420 |
| 2003/0011592 | A1 * | 1/2003 | Southwell et al. | 345/420 |
| 2009/0009518 | A1 * | 1/2009 | Ohtani | 345/443 |

OTHER PUBLICATIONS

CJ Ganier, "What is Direct Memory Access (DMA)?", http://cnx.org/content/m11867//latest/, Aug. 21, 2005.*
Wikipedia: Triangle Mesh, http://en.wikipedia.org/wiki/Triangle_mesh.*
Wikipedia: Triangle Fan, http://en.wikipedia.org/wiki/Triangle_fan.*
Botsch et al. "Geometric modeling based on triangle meshes", SIGGRAPH '06, Jul. 2006.*

* cited by examiner

*Primary Examiner*—Michelle K Lay
(74) *Attorney, Agent, or Firm*—Thomas, Kayden, Horstemeyer & Risley

(57) ABSTRACT

An input stream of graphics primitives may be converted into to a predetermined output stream of graphics primitives by a processor in a graphics pipeline. The processor recognizes a predetermined sequence pattern in the input stream of graphics primitives to the processor. The processor determines whether the recognized sequence pattern can be converted into the one of the plurality of predetermined output streams of graphics primitives. If so, the processor identifies a number of vertices in the recognized sequence pattern and reorders the vertices into a predetermined output pattern. Thereafter, the processor outputs the predetermined output pattern corresponding to one or more graphics processing components.

20 Claims, 6 Drawing Sheets

GEOMETRY PRIMITIVE TYPE CONVERSION IN A GPU PIPELINE

TECHNICAL FIELD

The present disclosure relates to graphics processing, and more particularly, to a method and apparatus for consolidating a number of primitive types processed by a graphics pipeline.

BACKGROUND

Current computer applications are generally more graphically intense and involve a higher degree of graphics processing power than predecessors. Applications, such as games, typically involve complex and highly detailed graphics renderings that involve a substantial amount of ongoing computations. To match the demands made by consumers for increased graphics capabilities in computing applications, like games, computer configurations have also changed.

As computers, particularly personal computers, have been programmed to handle programmers' ever increasingly demanding entertainment and multimedia applications, such as high definition video and the latest 3D games, higher demands have likewise been placed on system bandwidth. Thus, methods have arisen to deliver the bandwidth for such bandwidth hungry applications, as well as providing additional bandwidth headroom for future generations of applications.

For these reasons, current computer systems oftentimes include multiple processors. For example, a graphics processing unit (GPU) is an example of a coprocessor in addition to a primary processor, such as a central processing unit (CPU), that performs specialized processing tasks for which it is designed. In performing these tasks, the GPU may free the CPU to perform other tasks. In some cases, coprocessors, such as a GPU, may actually reside on the computer system's motherboard along with the CPU, which may be a microprocessor. However, in other applications, as one of ordinary skill in the art would know, a GPU and/or other coprocessing devices may reside on a separate but electrically coupled card, such as in the case of the GPU.

A coprocessor such as a GPU may often access supplemental memory, such as video memory, for performing its processing tasks. Coprocessors may be generally configured and optimized for performing specialized tasks. In the case of the GPU, such devices may be optimized for execution of three dimensional graphics calculations to support applications with intensive graphics. While conventional computer systems and coprocessors may adequately perform when running a single graphically intensive application, such computer systems and coprocessors may nevertheless encounter problems when attempting to execute multiple graphically intensive applications at once.

In general, a GPU input may be represented as a stream of primitives, which are basic elements that may represent graphic elements, such as a point, line, circle, triangle, etc., which are two-dimensional primitives. In a solid modeling system, three dimensional primitives include a cylinder, cube and sphere among others, such as, in some instances, a triangle and/or a line as well. The primitives may also constitute predefined patterns with certain rules that are applied by the GPU.

Graphically intense applications can oftentimes include a variety of primitives to be processed by the GPU. A set of primitives may be defined by graphics application programming interface (API) standards, such as OpenGL (Open Graphics Library) and/or D3D (Direct 3D). OpenGL is a standard specification defining a cross-language cross-platform API for writing applications that produce 2D and 3D computer graphics. D3D is a Microsoft® standard used in conjunction with various Windows® systems for rendering 2D and 3D computer graphics.

The GPU may be called upon to process many different kinds of primitives including primitives that are legacy primitives. At the beginning of the GPU pipeline, processing components may communicate the different primitives to the various processing components in a predetermined fashion.

Yet, due to the variety and corresponding complexity of such primitives, GPU pipelines are generally configured with a large number of processing gates so as to handle the multiple types of primitives that may need processing. As some of these types of primitives are complex, the various processing components of the GPU pipeline may include, as a nonlimiting example, 200,000 additional gates so as to be able to process more complex primitives, such as a triangle fan or quad list.

By increasing the number of gates in each of the processing components of the GPU pipeline, the costs of manufacturing such GPU pipelines is expensive, but is otherwise needed in the GPU if certain types of primitives are to be processed in the GPU pipeline. But if the processing components of the GPU pipeline can be configured with a less number of gates while still somehow handling the variety of primitives that may come via the input stream to the GPU, then the associated cost of the processing components is less.

Thus, there is a heretofore-unaddressed need to overcome these deficiencies and shortcomings described above.

SUMMARY

An input stream of graphics primitives may be converted into to a predetermined output stream of graphics primitives by a processor in a graphics pipeline. The processor recognizes a predetermined sequence pattern in the input stream of graphics primitives to the processor. The processor determines whether the recognized sequence pattern can be converted into the one of the plurality of predetermined output streams of graphics primitives. If so, the processor identifies a number of vertices in the recognized sequence pattern and reorders the vertices into a predetermined output pattern. Thereafter, the processor outputs the predetermined output pattern corresponding to one or more graphics processing components.

The recognized predetermined sequence pattern in the input stream of graphics API defined primitives may include a triangle fan, quad strip, quad list, point, line strip, triangle strip, an adjacent triangle strip, and a line strip with an adjacent line strip. The processor may be configured to convert the triangle fan, quad strip, quad list, and other such primitives in the input stream to one of the following predetermined output primitives: a point, line strip, triangle strip, an adjacent triangle strip, or a line strip with an adjacent line strip. The conversion may occur iteratively as primitives are received by the processor and output thereafter to the rest of the graphics pipeline.

DETAILED DESCRIPTION OF DRAWINGS

DETAILED DESCRIPTION

Figure 1:
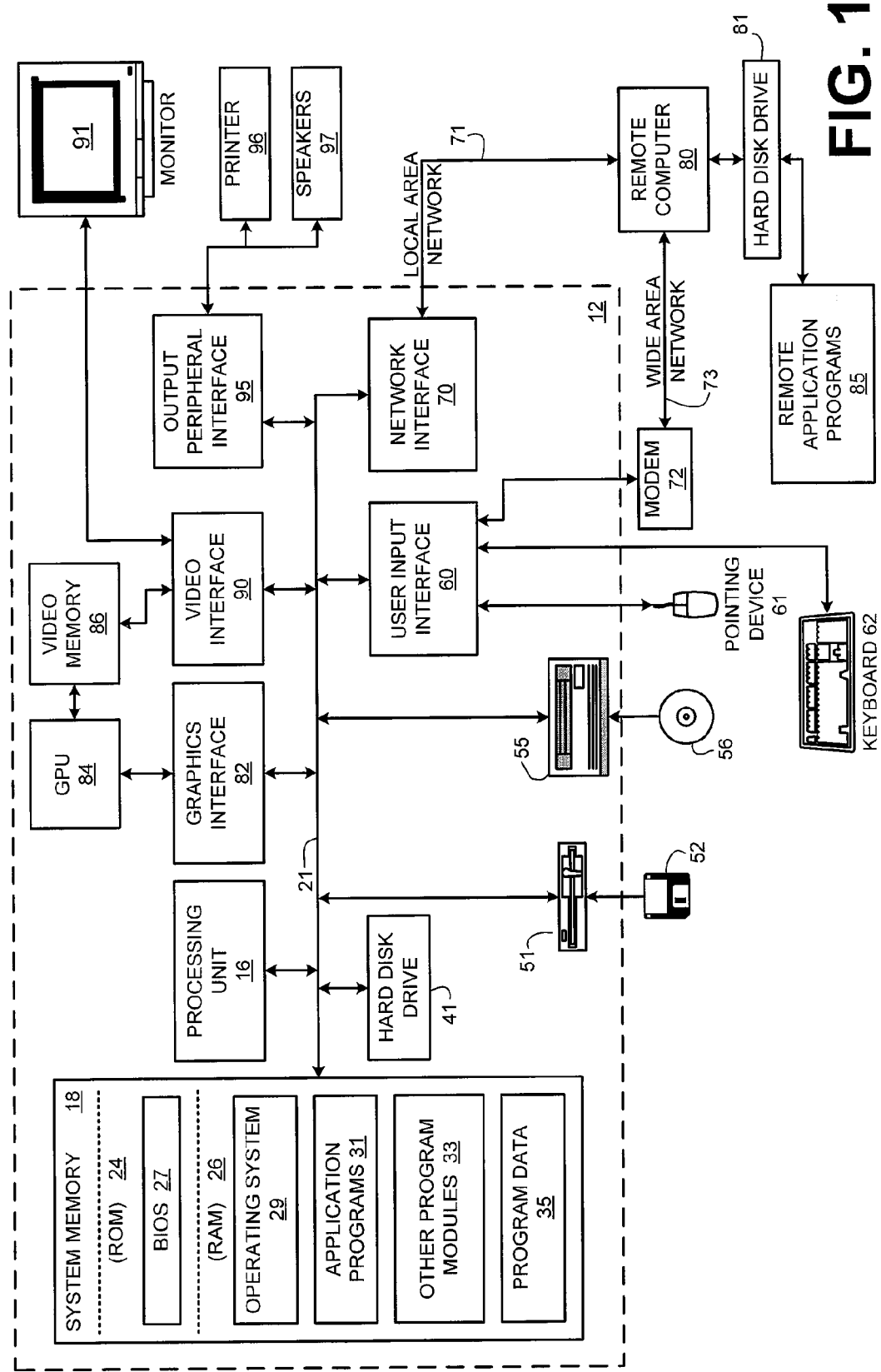
FIG. 1 is a diagram illustrating an exemplary nonlimiting computing system that includes a computer.

FIG. 1 is a diagram illustrating an exemplary nonlimiting computing system 10 that includes a computer 12. The components of the computer 12 may include, as nonlimiting examples, a processing unit 16, a system memory 18, and a system bus 21 that couples various system components, including the system memory 18, to the processing unit 16. The system bus 21 may be any of several types of bus structures, as one of ordinary skill in the art would know, including a memory bus or memory controller, a peripheral bus, and a local bus using any of a variety of bus architectures. As a nonlimiting example, such architectures may include a peripheral component interconnect (PCI) bus, accelerated graphics port (AGP), and/or PCI Express bus.

Computer 12 may include a variety of computer readable media. Computer readable media can be any available media that can be accessed by computer 12 and includes both volatile and nonvolatile memory, which may be removable, or nonremovable memory.

The system memory 18 may include computer storage media in the form of volatile and/or nonvolatile memory, such as read only memory (ROM) 24 and random access memory (RAM) 26. A basic input/output system 27 (BIOS) may be stored in ROM 24. As a nonlimiting example, operating system 29, application programs 31, other program modules 33, and program data 35 may be contained in RAM 26.

Computer 12 may also include other removable/nonremovable volatile/nonvolatile computer storage media. As a nonlimiting example, a hard disk drive 41 may read from or write to nonremovable, nonvolatile magnetic media. A magnetic disk drive 51 may read from or write to a removable, nonvolatile magnetic disk 52. An optical disk drive 55 may read from or write to optical disk 56.

A user may enter commands and information into computer 12 through input devices such as keyboard 62 and pointing device 61, which may be coupled to processing unit 16 through a user input interface 60 that is coupled to system bus 21. However, one of ordinary skill in the art would know that other interface and bus structures such as a parallel port, game port, or a universal serial bus (USB) may also be utilized for coupling these devices to the computer 12.

One or more graphics processing units (GPUs) 84 may communicate with the graphics interface 82 that is coupled to system bus 21. As a nonlimiting example, GPU 84 may include on-chip memory storage, such as register storage and cache memory. GPU 84 may also communicate with a video memory 86, as desired.

A monitor 91 or other type of display device may be also coupled to system bus 21 via a video interface 90, which may also communicate with video memory 86. In addition to monitor 91, computer system 10 may also include other peripheral output devices, such as printer 96 and speakers 97, which may be coupled via output peripheral interface 95.

Computer 12 may operate in networked or distributed environments using logical connections to one or more remote computers, such as remote computer 80. Remote computer 80 may be a personal computer, a server, a router, a network PC, a pier device, or other common network node. Remote computer 80 may also include many or all of the elements described above in regard to computer 12, even though only memory storage device 81 and remote application programs 85 are depicted in FIG. 1. The logical connections depicted in FIG. 1 include a local area network (LAN) 71 and a wide area network (WAN) 73, but may include other network/buses, as one of ordinary skill in the art would know.

In this nonlimiting example of FIG. 1, remote computer 80 may be coupled to computer 12 via LAN connection 71 and network interface 70. Likewise, a modem 72 may be used to couple computer 12 (via user input interface 60) to remote computer 80 across WAN connection 73.

As stated above, the GPU 84 may be configured to switch processes, or contexts, during the processing of another context, or operation. In this instance, the GPU 84 is configured to save an interrupted context and to initiate processing of another context, which itself may have been previously interrupted and saved.

GPU 84 may be configured to support sequential execution of multiple GPU programs (commands) belonging to the same context. Yet, as stated above, in order to synchronize execution of the GPU 84 in tandem with processing unit 16, multiple levels or synchronization may be utilized.

Figure 2:
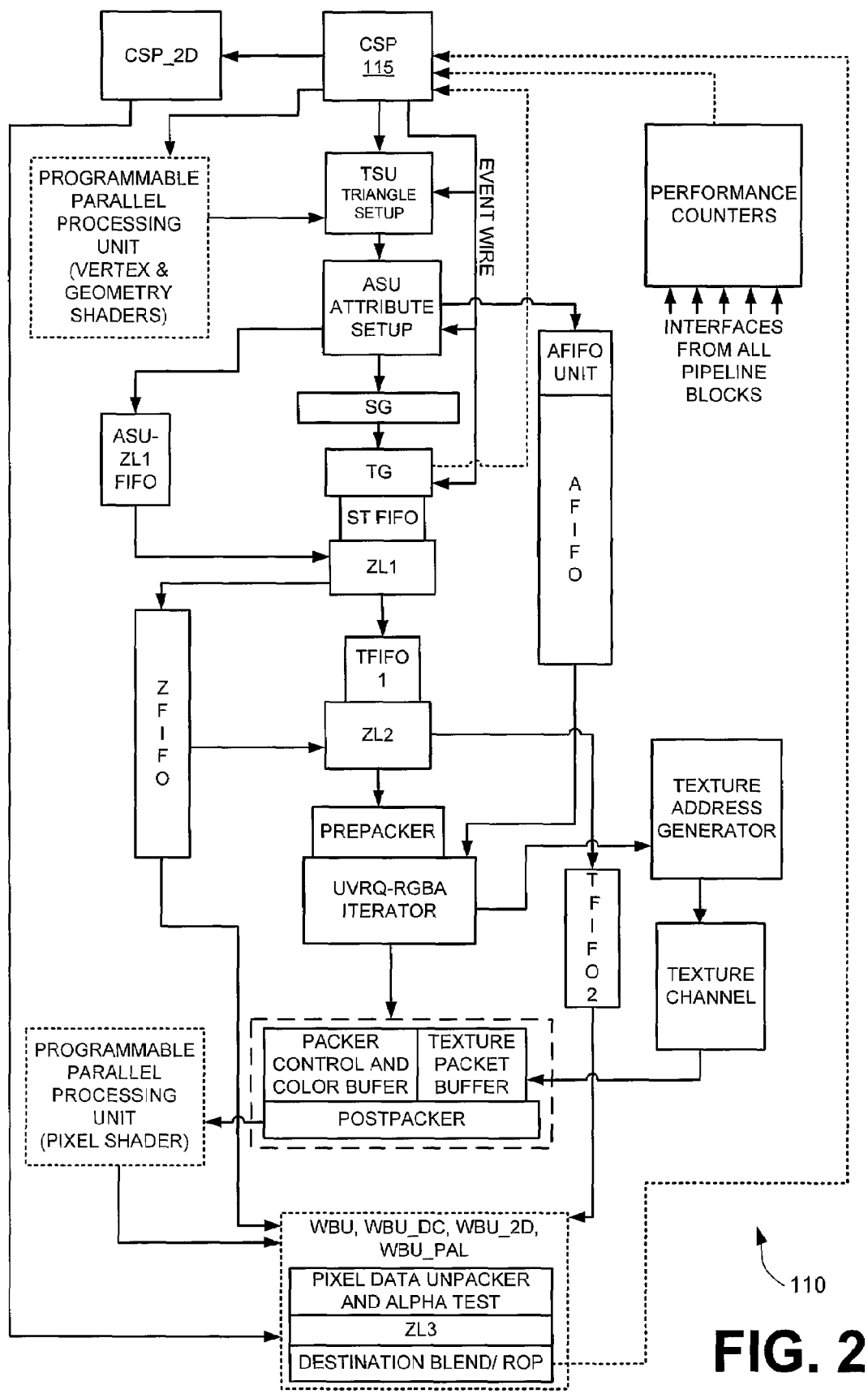
FIG. 2 is a diagram of typical graphics pipeline that may be found in the GPU of FIG. 1.

FIG. 2 is a diagram of a graphics pipeline 110 that may be found in a GPU 84 that one of ordinary skill in the art would know. Although the individual components that comprise the graphics pipeline 110 are not separately described herein, one of ordinary skill in the art would understand their operation and interaction so as to process graphical information.

As a general description, the command stream processor ("CSP") 115 is a fully programmable machine that is positioned at the beginning of the GPU pipeline 110 and processes all commands coming from the host CPU. The CSP 115 may implement parsing of the command stream; privilege checking for "trusted computing"; assembly of component data from multiple streams; top-of-pipe fences; page fault detection; and GPU interrupts and/or context switches.

As discussed above, the CSP 115 and the rest of the GPU pipeline 110 of FIG. 2 may receive in the input stream to the GPU 84 a multitude of primitives that may result in complex processing operations. However, if the CSP 115 can be configured to convert any of the types of primitives that it may receive in the input stream to one of a predefined and reduced number of primitive types, then the GPU pipeline 110 can be constructed with a fewer number of gates per processing component. If the GPU pipeline's components contain a fewer number of gates, then the GPU pipeline should be less expensive to manufacture and potentially faster in operation. As a nonlimiting example, CSP 115 may be configured to receive complex graphics primitives but output the complex graphics primitives as one of the following predetermined outputs:

1. Point;
2. Line strip;
3. Triangle strip;

4. Adjacent triangle strip; and
5. Line strip with adjacent line strip.

Figure 3:
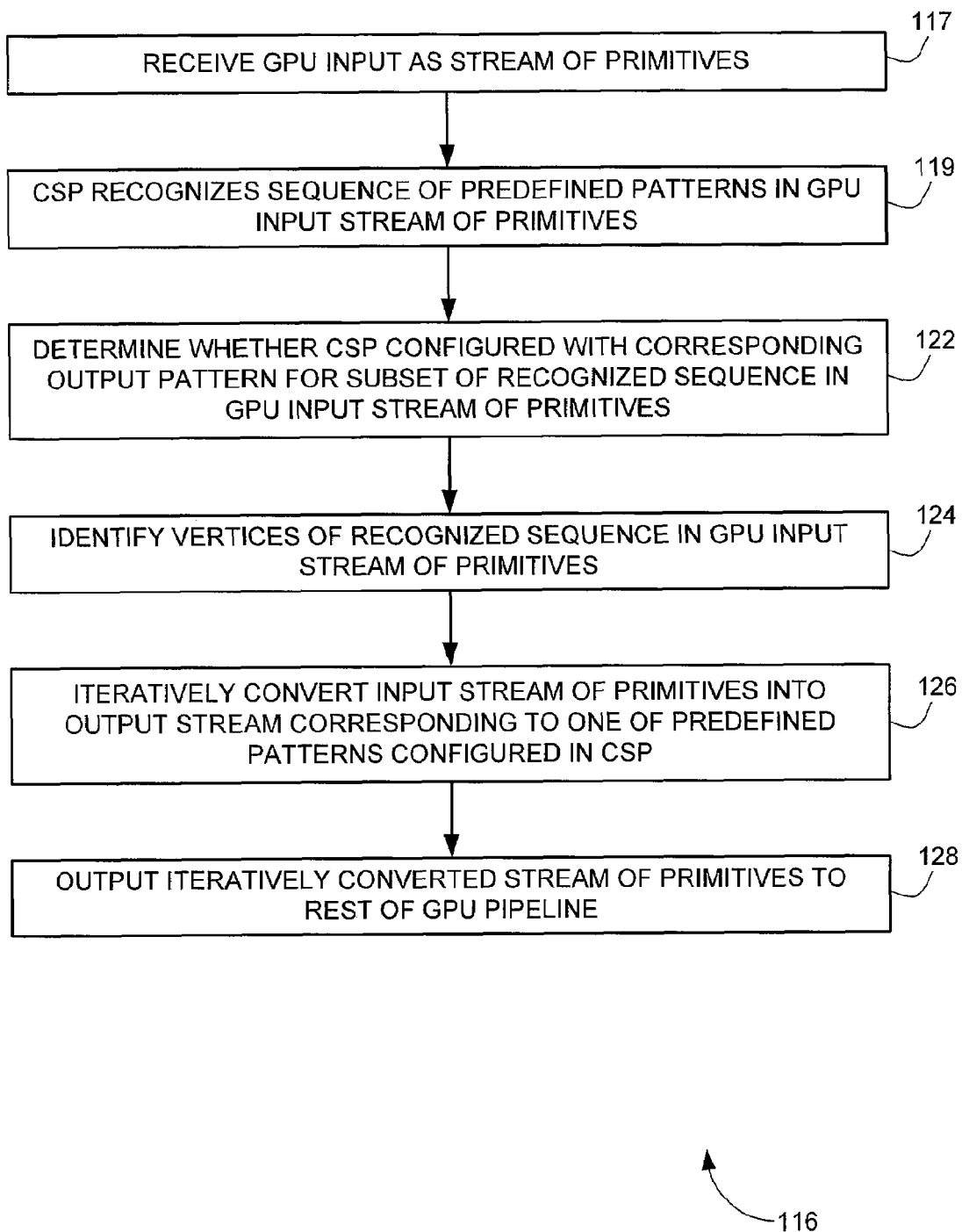
FIG. 3 is a flowchart diagram of a number of logic steps that may be configured for execution by the CSP of FIG. 2 for converting a predetermined input sequence into a predetermined output sequence.

FIG. 3 is a flowchart diagram of the process 116 depicting a number of logic steps that may be configured for execution by the CSP 115 of FIG. 2 for converting a predetermined input sequence into a predetermined output sequence. One of ordinary skill in the art would readily appreciate that such logic steps may comprise programming that makes use of pattern-directed invocation of procedures from predetermined assertions and goals, such as those contained and discussed herein. Nevertheless, in step 117 of FIG. 3, the CSP 115 may receive a GPU input stream that may be represented as a stream of primitives. Upon receiving the input stream, the CSP 115 may thereafter recognize a predetermined pattern in the input stream, as shown in step 119.

Figure 4:
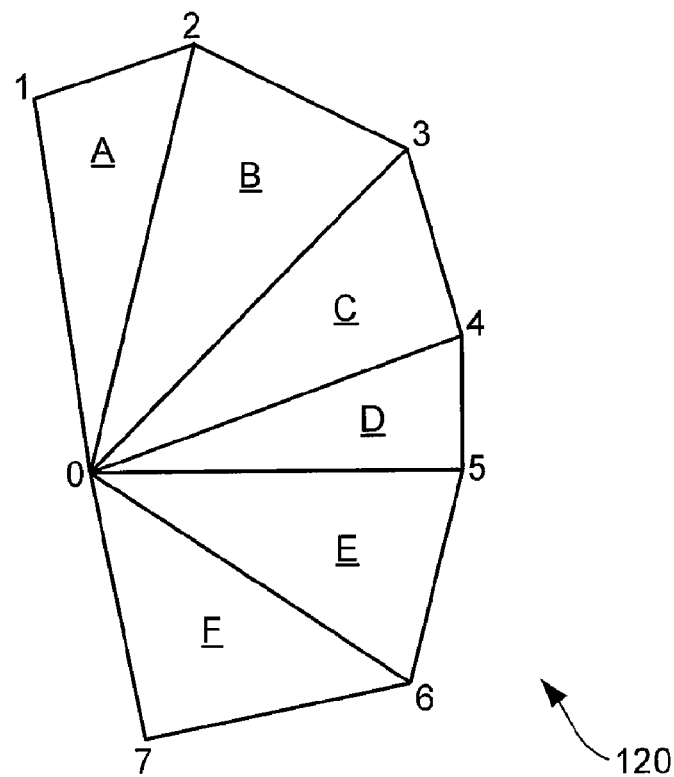
FIG. 4 is a diagram of a triangle fan that may be received by the CSP of FIG. 2 in the input stream and recognized as such, that is, according the process of FIG. 3.

As a nonlimiting example, one of the complex primitives that may be included in the input stream to the CSP 115 may include a triangle fan, which is an object containing a number of triangles. FIG. 4 is a diagram of a triangle fan 120 that may be received by the CSP 115 of FIG. 2 in the input stream and recognized as such, that is, according to step 119 of FIG. 3. In this nonlimiting example, triangle fan 120 contains six triangles and eight vertices, which are labeled 0-7.

Figure 5:
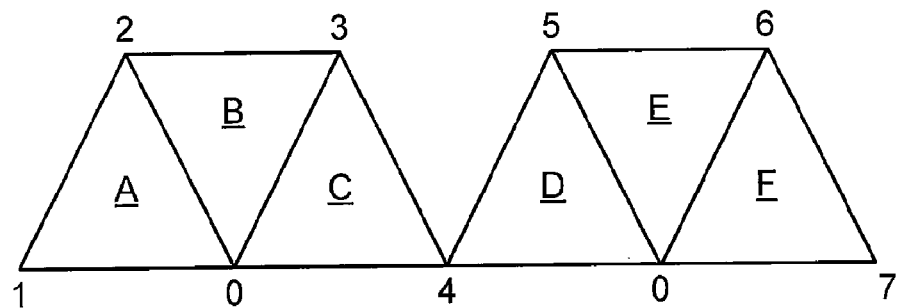
FIG. 5 is a diagram of a triangle strip that may correspond to the triangle fan of FIG. 4.

If the triangle fan 120 of FIG. 4 can be reordered into one of the five predetermined output types listed above, then the processing components of GPU pipeline 110 (FIG. 2) may not be configured to include the additional number of logic gates that might otherwise be needed to process the triangle fan 120. So the CSP 115 may receive the triangle fan 120 and determine, as shown in step 122, whether the CSP 115 can reorder the components of the triangle fan 120 into a predetermined output. The predetermined output may be, in this nonlimiting example, a triangle strip. FIG. 5 is a diagram of a triangle strip 130 that may correspond to the triangle fan 120 of FIG. 3. More specifically, the triangle strip 130 of FIG. 5 is configured such that the vertices 0-7 of the triangle fan 120 are reordered, as shown in FIG. 4.

This reordering is possible in part because the CSP 115 identifies and references from a current position in both the input stream for the triangle fan 120 and also the triangle strip 130, which is what may be output to the GPU pipeline 110. Stated another way, the CSP 115 is capable of implementing this nonlimiting conversion because there is a predetermined output (i.e., the triangle strip 130) for the input stream pattern (i.e., the triangle fan 120). This result occurs, however, when the CSP 115 is able to generate a predetermined output pattern for a corresponding predetermined input pattern.

To reorder the input sequence into the predetermined output sequence, the CSP 115 may identify the vertices of the input stream, as shown in step 124 of FIG. 3. Thus, in the nonlimiting example of the triangle fan 120, the CSP 115 may represent the triangle fan 120 sequence as follows, that is, where:

$$F = \{v_0, v_1, v_2, \ldots v_{n-1}\} \quad (1)$$

The sequence of generated triangles in the triangle fan 120 may be represented as:

$$T = \{\{v_0, v_1, v_2\}, \{v_0, v_2, v_3\}, \ldots, \{v_0, v_{n-2}, v_{n-1}\}\} \quad (2)$$

The vertices $v_0, v_1, v_2$ correspond to triangle "A" of FIG. 4, and vertices $v_0, v_2, v_3$ correspond to triangle "B." One of ordinary skill in the art would understand the grouping therefore of vertices comprising sequence T based on the remaining triangles "C"-"F" in FIG. 4.

The same sequence of the triangle, as shown in FIG. 4, may be converted in step 126 of FIG. 3 into the following triangle strip 130 of FIG. 5, where S is the output stream:

$$S = \{\{v_1, v_2, v_0, v_3, v_4\}, \{v_4, v_5, v_0, v_6, v_7\}, \ldots, \{v_{3k+1}, v_{3k+2}, v_0, v_{3k+3}, v_{3k+4}\}\} \quad (3)$$

In triangle strip 130, vertices $v_1, v_2, v_0, v_3, v_4$ correspond to triangles "A," "B," and "C." Likewise, vertices $v_4, v_5, v_0, v_6, v_7$ in triangle strip 130 of FIG. 5 correspond to triangles "D," "E," and "F."

Each of the triangle strip sequences may be sent to the GPU pipeline 110 on a one-to-one basis. But to convert the triangle fan 120, as represented by sequence (1), to triangle strip 130, as represented by sequence (3), the following rules may be implemented and executed by the CSP 115:

$$S_{5k} = F_{3k+1}$$

$$S_{5k+1} = F_{3k+2}$$

$$S_{5k+2} = F_0$$

$$S_{5k+3} = F_{3k+3}$$

$$S_{5k+4} = F_{3k+4} \quad (4)$$

In regard to an input stream that contains a number of triangle fans 120 the above conversion to a triangle strip 130 may be performed iteratively. Thus, the conversion pattern for the nonlimiting triangle fan 120 to triangle strip 130 may be defined as follows:

$$L = 5 \quad (5)$$

$$I = 1$$

$$E = -10$$

$$C = \{1, E, 1, 1, 0\}$$

$$i_0 = I$$

$$I_0 = O$$

$$i_{n+1} = \begin{cases} i_n + C_{I_n}, & C_{I_n} \neq E, C_{I_{n-1}} \neq E \\ i_{n-1} + C_{I_n}, & C_{I_n} \neq E, C_{I_{n-1}} = E \\ 0, & C_{I_n} = E \end{cases}$$

$$I_{n+1} = \begin{cases} I_{n-1} + 1, & I_n \neq L - 1 \\ 0, & I_n = L - 1 \end{cases}$$

$$S_n = F_{i_n}$$

The parameters L, I, and C define the conversion pattern, the parameter E is used to insert exceptions, and should not coincide with any other valuable members of the C. More specifically, L relates to the period of output, which is 5—the number of vertices per triangle strip. Additionally, I represents the index of the first element to output, which is 1, as shown in the first triangle strip of FIG. 4. The exception parameter E may constitute a value, such as −10, so as to be purposefully different from any usable value in C, which are the increments between vertices.

Nevertheless, the output stream S corresponding to triangle strip 130 may be output by CSP 115 to the rest of GPU pipeline 110 of FIG. 2 for further processing. In this way, the rest of the processing components in GPU pipeline 110 do not need logic gates for processing a triangle fan due to this conversion, as shown in FIG. 3, thereby resulting in a graphics pipeline composed of fewer logic gates, which may be less expensive to manufacture and potentially faster in execution.

Figure 6:
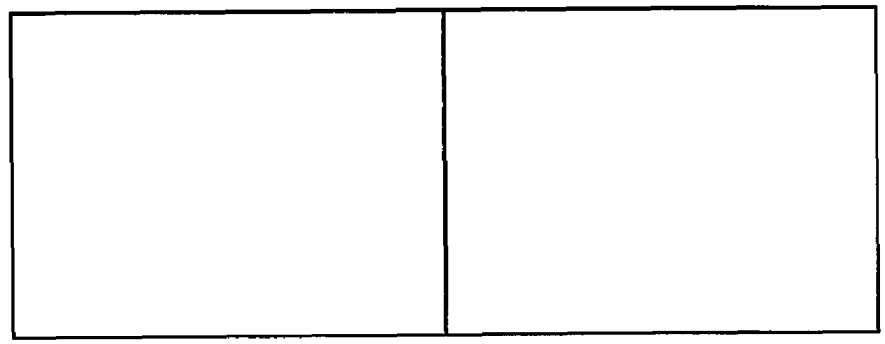
FIG. 6 is a diagram of a quad list that may be contained in the input stream to the CSP of FIG. 2.

As an alternate nonlimiting example, the input stream to CSP 115 may comprise a quad list instead of triangle fan 120 of FIG. 4. FIG. 6 is a diagram of quad list 150 that may be processed by the GPU pipeline of FIG. 2. Quad list 150, however, may be reordered into a triangle strip for processing, thereby obviating the GPU pipeline 110 from being constructed with the increased number of logic gates specifically configured to process a quad list.

Figure 7:
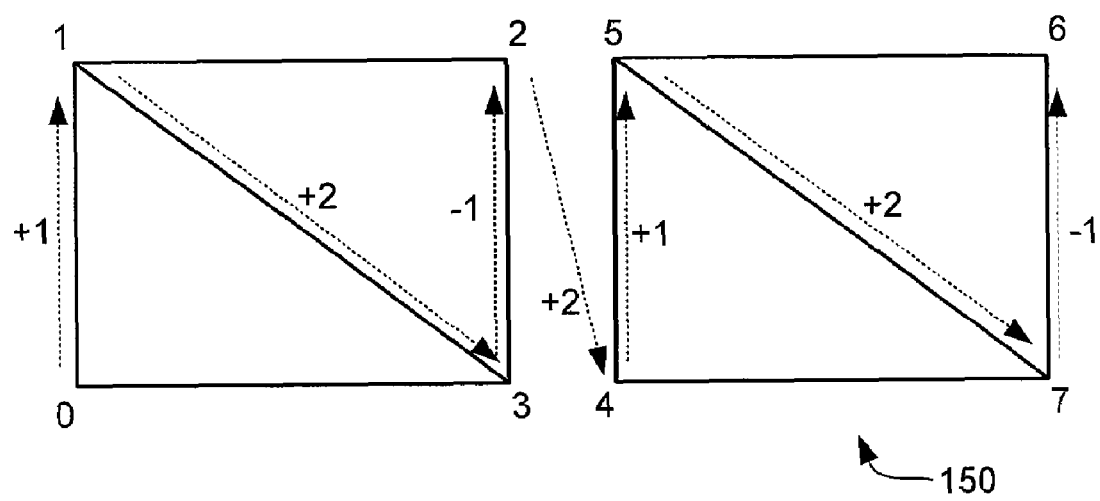
FIG. 7 is a diagram of the quad list of FIG. 6 depicting at least one procedure for converting the quad list to a triangle strip.

Thus, FIG. 7 is a diagram of the quad list 150 of FIG. 6 depicting at least one procedure for converting the quad list 150 to a triangle strip, which is somewhat similar to as shown in FIG. 4. More specifically, quad list 150 may be converted to a triangle strip according to the following sequence of generated triangles, which are depicted in FIG. 7 via dashed lines:

$$T=\{\{v_0, v_1, v_3\}, \{v_1, v_3, v_2\}, \ldots, \{v_{n-3}, v_{n-2}, v_{n-1}\}\} \quad (6)$$

In this instance, the parameters L, E, and C are as follows:

L=5

I=1

E=−10

C={1, E, 1, 1, 0}

In applying algorithm (5) depicted above, the input stream containing quad list 150 may be converted into the following output stream:

$$S=\{\{v_0, v_1, v_3, v_2\}, \{v_4, v_5, v_7, v_6\}, \ldots, \{v_{4k}, v_{4k+1}, v_{4k+2}, v_{4k+3}\}\}. \quad (7)$$

Using this process, any primitive input stream may be converted into one of a predetermined number of primitive output streams. As a nonlimiting example, and as described above, the CSP 115 may be configured to output any of the following outputs based on the designated input stream: (1) point; (2) line strip; (3) triangle strip; (4) adjacent triangle strip; and (5) line strip with adjacent triangle strip. Thus, the CSP 115 may be configured to output a designated primitive type for each of a one-dimensional, two-dimensional, and three-dimensional output type.

Primitive conversions may vary in certain instances, such as those involving flat shading. More specifically, draw primitive (DP) and draw index primitive (DIP) modes may result in different provoking vertices depending upon whether the input data stream is according to the OpenGL or D3D standard. The following table depicts at least one nonlimiting example for identifying and selecting a provoking vertex, or the vertex upon which for a flat shading primitive carries the color information.

| Flat Shading | OpenGL | D3D |
| --- | --- | --- |
| Triangle List | 3 * (i + 2) | 3 * i |
| Triangle Strip | i + 2 | i |
| Triangle Fan | i + 2 | i + 1 |
| Line List | 2 * i | 2 * i |
| Line Strip | i + 1 | i |
| Quad | 4 * i + 3 | — |
| Quad Strip | 2 * 1 + 3 | — |
| Polygon | 0 | — |

Thus, when primitives are flat shading primitive types, they may be processed differently. The CSP 115, as discussed above, that may be configured to translate the primitive into the corresponding output type. So in addition to the nonlimiting examples above, the following list of input primitives and output strips may be implemented by the CSP 115:

| Input Primitive Type (depicting input order of vertices) | CSP Output (depicting reordered vertices) |
| --- | --- |
| OpenGL Quad Strip | Triangle strip |
| Point list | Point list |
| Line list | Line strip |
| Line list vertices: 0, 1, 2, 3, 4, 5, 6, 7 | Line strip: 0, 1, cut, 2, 3, cut, 4, 5, cut, 6, 7, cut |
| Line Strip | Line Strip |
| OpenGL Line strip with flat shading | Line Strip |
| OPENGL Line strip vertices: 0, 1, 2, 3, 4, 5, 6, 7, 8, 9 | D3D Line strip: 1, 0, cut, 3, 2, cut, 5, 4, cut, 7, 6, cut, 9, 8, cut |
| Triangle List | Triangle Strip |
| Triangle List vertices: 0, 1, 2, 3, 4, 5, 6, 7, 8, | Triangle Strip: 0, 1, 2, cut, 3, 4, 5, cut, 6, 7, 8, cut |
| Triangle Strip | Triangle Strip |
| OpenGL Triangle Strip with flat shading | Triangle Strip |
| OpenGL Triangle Strip vertices: 0, 1, 2, 3, 4, 5, 6, 7, 8, 9 | D3D triangle strip: 2, 0, 1, cut, 3, 2, 1, cut, 4, 2, 3, cut, 5, 4, 3, cut, . . . |
| Triangle Fan | Triangle Strip |
| D3D triangle fan vertices: 0, 1, 2, 3, 4, 5, 6, 7, 8, 9 | D3D triangle strip: 1, 2, 0, cut, 2, 3, 0, cut, 3, 4, 0, cut, 4, 5, cut . . . |
| OpenGL Triangle Fan | Triangle Strip |
| OPENGL triangle fan vertices: 0, 1, 2, 3, 4, 5, 6, 7, 8, 9 | D3D triangle strip: 2, 0, 1, cut 3, 0, 2, cut, 4, 0, 3, cut, 5, 0, 4, cut |
| OpenGL Quad List | Triangle Strip |
| OPENGL quadlist vertices: 0, 1, 2, 3, 4, 5, 6, 7, 8, 9, a, b | D3D triangle strip: 3, 0, 1, cut, 3, 1, 2, cut, 7, 4, 5, cut, 7, 5, 6, cut . . . |
| OpenGL Quad Strip | Triangle Strip |
| OPENGL Quad Strip vertices: 0, 1, 2, 3, 4, 5, 6, 7, 8, 9 | D3D triangle strip: 2, 0, 1, cut, 2, 1, 3, cut, 4, 2, 3, cut, 4, 3, 5, cut, 6, 4, 5, cut, 6, 5, 7, cut . . . |

Figure 8:
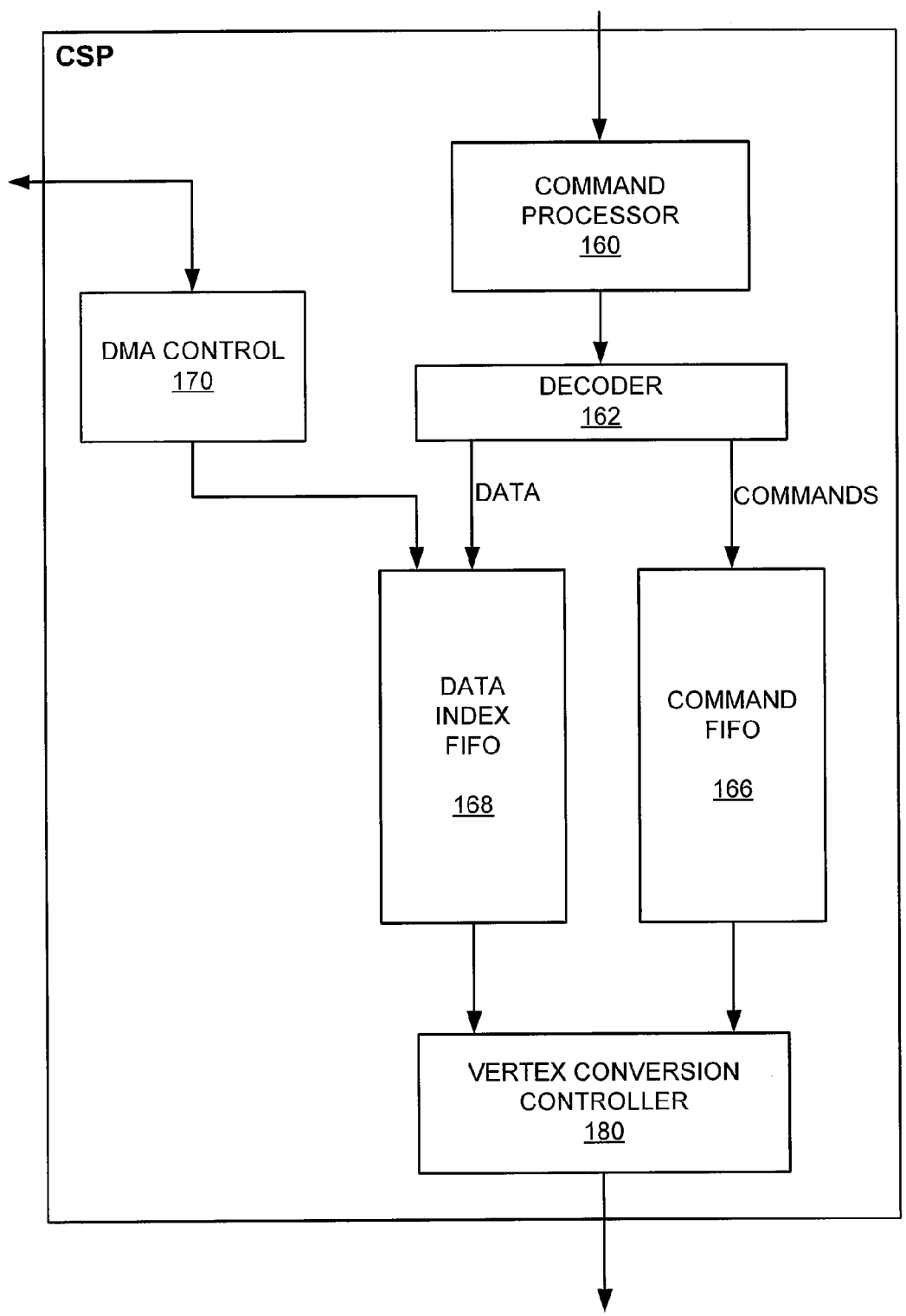
FIG. 8 is a diagram of a portion of the CSP of FIG. 2 that may be configured for implementing logic for converting predetermined input primitives to predetermined output primitives.

FIG. 8 is a diagram of the CSP 115 of FIG. 2 depicting a portion of the components of the CSP 115 that may be implemented for translating the primitives cited in the left column in the table immediately above with the output primitives in the right column in the table immediately above. The input primitives received by the CSP 115 may be forwarded to a command processor 160, which forwards the primitives to a decoder 162, which as a nonlimiting example, may be a geometry index engine command decoder 162 may be to separate the primitive into its respective command and data. The command may relate to the type of primitive and the data may correspond to the respective vertex information for the primitive.

Decoder 162 may forward command information for an input primitive to command FIFO 166. Command FIFO 166 may be, as a nonlimiting example, sized so as to hold at least one command at a time.

Decoder 162 may also forward vertex-related data corresponding to the input primitive to a data index FIFO 168. This data index FIFO 168 may store the vertex data so as to be retrieved and reordered according to the predetermined output primitive, as discussed above. Data index FIFO 168 may also receive additional data associated with the input primitive from DMA control 170, which simply is a representative block that may include a DMA read controller, memory access controller, and/or a memory exchange unit.

The vertex conversion controller 180 may receive commands associated with a predetermined input primitive from the command FIFO 166 and then access data in a predetermined order, as shown in the table above for the corresponding output primitive. Stated another way, upon receiving a command from command FIFO 166, the vertex conversion controller 180 may access data from data index FIFO 168 in the order that corresponds to the corresponding output primitive for that input primitive. Thus, the vertex conversion controller 180 may output to the rest of the GPU pipeline 110 data corresponding to one of the predetermined output primitives, as discussed above. In this way, each of the processing components of GPU pipeline 110 may be constructed with fewer logic gates that may otherwise be used for processing the broader number of input primitives. Accordingly, the GPU pipeline 110 may be constructed more inexpensively while maintaining desired processing efficiency.

It should be emphasized that the above-described embodiments and nonlimiting examples are merely possible examples of implementations, merely set forth for a clear understanding of the principles disclosed herein. Many variations and modifications may be made to the above-described embodiment(s) and nonlimiting examples without departing substantially from the spirit and principles disclosed herein. All such modifications and variations are intended to be included herein within the scope of this disclosure and protected by the following claims.

The invention claimed is:

1. A method performed by a computing device executing programmed instructions for converting an input stream of graphics primitives, comprising the steps of:
   recognizing, by the computing device, a first pattern within the input stream of graphics primitives;
   determining, by the computing device, whether the first pattern in the input stream of graphics primitives can be converted into one of a plurality of predetermined output streams of graphics primitives;
   identifying, by the computing device, a number of vertices in the first pattern in the input stream of graphics primitives;
   reordering, by the computing device, the identified number of vertices in the input stream of graphics primitives in the first pattern into one of a plurality of predetermined patterns according to a plurality of converting parameters; and
   outputting, by the computing device, the reordered output stream of graphics primitives in the determined one of the plurality of predetermined patterns to one or more graphics processing components,
   wherein the plurality of converting parameters comprises:
      a number of vertices per graphics primitive in the predetermined pattern;
      an index of a first element of the output stream of graphics primitives; and
      an exception value for inserting exceptions, the exception value being different from any usable value of a conversion pattern defined by the number of vertices and the index.

2. The method of claim 1, wherein the reordering of the identified number of vertices in the recognized one of the plurality of predetermined sequence patterns in the input stream of graphics primitives into the predetermined pattern corresponding to the one of the plurality of predetermined output streams of graphics primitives occurs iteratively.

3. The method of claim 1, wherein at least one of the plurality of predetermined output streams of graphics primitives is a point.

4. The method of claim 1, wherein at least one of the plurality of predetermined output streams of graphics primitives is a line strip.

5. The method of claim 1, wherein at least one of the plurality of predetermined output streams of graphics primitives is a triangle strip.

6. The method of claim 1, wherein at least one of the plurality of predetermined output streams of graphics primitives is an adjacent triangle strip.

7. The method of claim 1, wherein at least one of the plurality of predetermined output streams of graphics primitives is a line strip with an adjacent line strip.

8. The method of claim 1, wherein the first pattern in the input stream of graphics primitives is one of a triangle fan, quad list, and a quad strip.

9. The method of claim 1, wherein a command stream processor executes the reordering of the identified number of vertices into the predetermined pattern corresponding to the one of the plurality of predetermined output streams of graphics primitives.

10. A graphics processing unit configured to convert an input stream of graphics primitives to one or a plurality of predetermined output streams of graphics primitives, comprising:
   an input configured to receive an input stream corresponding to graphics primitives;
   logic configured to recognize a predetermined sequence pattern in the input stream corresponding to graphics patterns and to determine if the recognized sequence pattern can be converted into one of the plurality of predetermined output streams of graphics primitives;
   logic configured to identify a number of vertices in the recognized sequence pattern and to reorder the identified vertices into a predetermined pattern corresponding to the one of the plurality of predetermined output streams of graphics primitives, wherein reordering is performed according to converting parameters comprising:
      a number of vertices per graphics primitive in the predetermined pattern;
      an index of a first element of the output stream of graphics primitives; and
      an exception value for inserting exceptions, the exception value being different from any usable value of a conversion pattern defined by the number of vertices and the index; and
   an output coupled to a plurality of graphics processing components configured to communicate the predetermined pattern corresponding to the one of the plurality of predetermined output streams of graphics primitives.

11. The graphics processing unit of claim 10, wherein at least one of the plurality of predetermined output streams of graphics primitives is a point.

12. The graphics processing unit of claim 10, wherein at least one of the plurality of predetermined output streams of graphics primitives is a line strip.

13. The graphics processing unit of claim 10, wherein at least one of the plurality of predetermined output streams of graphics primitives is a triangle strip.

14. The graphics processing unit of claim 10, wherein at least one of the plurality of predetermined output streams of graphics primitives is an adjacent triangle strip.

15. The graphics processing unit of claim 10, wherein at least one of the plurality of predetermined output streams of graphics primitives is a line strip with an adjacent line strip.

16. The graphics processing unit of claim 10, wherein at least one of the plurality of predetermined sequence patterns in the input stream of graphics primitives is one of a triangle fan, quad list, and a quad strip.

17. A processor for translating primitives, comprising:
- a decoder configured to separate a received primitive into a corresponding command relating to a type of primitive and data relating to vertex information for the received primitive;
- a command memory coupled to the decoder for receiving the command corresponding to the received primitive;
- a data memory coupled to the decoder for receiving the data relating to vertex information for the received primitive; and
- a vertex conversion controller configured to receive the command corresponding to the received primitive from the command memory and further configured to access the data relating to vertex information for the received primitive in the data memory in a predetermined output order that is translated from an order as associated with the received primitive according to converting parameters comprising:
  - a number of vertices per graphics primitive in the predetermined output order; and
  - an exception value for inserting exceptions,
- the vertex conversion controller having an output for transferring the data in the predetermined output order.

18. The processor of claim 17, wherein the output for transferring the data in the predetermined order is coupled to a processing block of a graphics pipeline.

19. The processor of claim 17, further comprising:
- a DMA control, coupled to the data memory to supply additional data associated with the input primitive.

20. The processor of claim 17, further comprising:
- a command processor, coupled to the decoder to receive input primitives and forward the input primitives to the decoder.

* * * * *